(12) United States Patent
Nakano et al.

(10) Patent No.: US 11,657,717 B2
(45) Date of Patent: May 23, 2023

(54) INFORMATION PROCESSING APPARATUS, INFORMATION PROCESSING METHOD, AND RECORDING MEDIUM

(71) Applicant: TOYOTA JIDOSHA KABUSHIKI KAISHA, Toyota (JP)

(72) Inventors: Yuki Nakano, Nisshin (JP); Masato Ura, Nisshin (JP); Koji Takao, Toyota (JP); Hideyuki Sakurai, Toyota (JP); Keisuke Hotta, Miyoshi (JP); Rieko Masutani, Toyota (JP); Atsushi Hanawa, Miyoshi (JP); Masanobu Ohmi, Kasugai (JP); Takashi Hayashi, Nagoya (JP); Atsushi Nabata, Nagakute (JP); Tetsuro Sakaguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 222 days.

(21) Appl. No.: 17/096,276

(22) Filed: Nov. 12, 2020

(65) Prior Publication Data

US 2021/0150907 A1 May 20, 2021

(30) Foreign Application Priority Data

Nov. 18, 2019 (JP) .............................. JP2019-208010

(51) Int. Cl.
| | |
|---|---|
| *G08G 1/00* | (2006.01) |
| *H04W 4/46* | (2018.01) |
| *G05D 1/02* | (2020.01) |

(52) U.S. Cl.
CPC ........... *G08G 1/202* (2013.01); *G05D 1/0293* (2013.01); *G05D 1/0295* (2013.01); *G08G 1/22* (2013.01); *H04W 4/46* (2018.02)

(58) Field of Classification Search
CPC ........ G08G 1/202; G08G 1/22; G05D 1/0293; G05D 1/0295; H04W 4/46
See application file for complete search history.

(56) References Cited

U.S. PATENT DOCUMENTS

| | | | |
|---|---|---|---|
| 10,545,509 B1 * | 1/2020 | Jessen | ................. B62D 63/025 |
| 2019/0287063 A1 * | 9/2019 | Skaaksrud | ............. B65G 67/24 |
| 2020/0050978 A1 * | 2/2020 | Perez Barrera | .... G06Q 30/0241 |

FOREIGN PATENT DOCUMENTS

| | | |
|---|---|---|
| JP | H10-059056 A | 3/1998 |
| JP | 2011216007 A | 10/2011 |
| JP | 2019101963 A | 6/2019 |

* cited by examiner

*Primary Examiner* — Alan D Hutchinson
*Assistant Examiner* — Andy Schneider
(74) *Attorney, Agent, or Firm* — Oliff PLC

(57) ABSTRACT

An information processing apparatus includes: a memory configured to store information about mobile bodies, each of which forms a vehicle by being coupled with a main body unit and is capable of autonomous driving; and a processor configured to transmit a summon command to a first mobile body existing within a predetermined range, the summon command summoning the first mobile body to a predetermined assembly location, and cause a predetermined number of first mobile bodies assembled at the predetermined assembly location to carry one first main body unit that is larger or heavier than a main body unit that can be carried by one first mobile body, and to cause the predetermined number of first mobile bodies to move to a predetermined destination.

18 Claims, 11 Drawing Sheets

FIG. 8

TRAVELING-UNIT INFORMATION TABLE

| TRAVELING UNIT ID | OWNER USER ID | LOADABLE WEIGHT | SCHEDULE ID | POSITION INFORMATION | STATE |
|---|---|---|---|---|---|
| UD001 | | | | | |
| UD002 | | | | | |

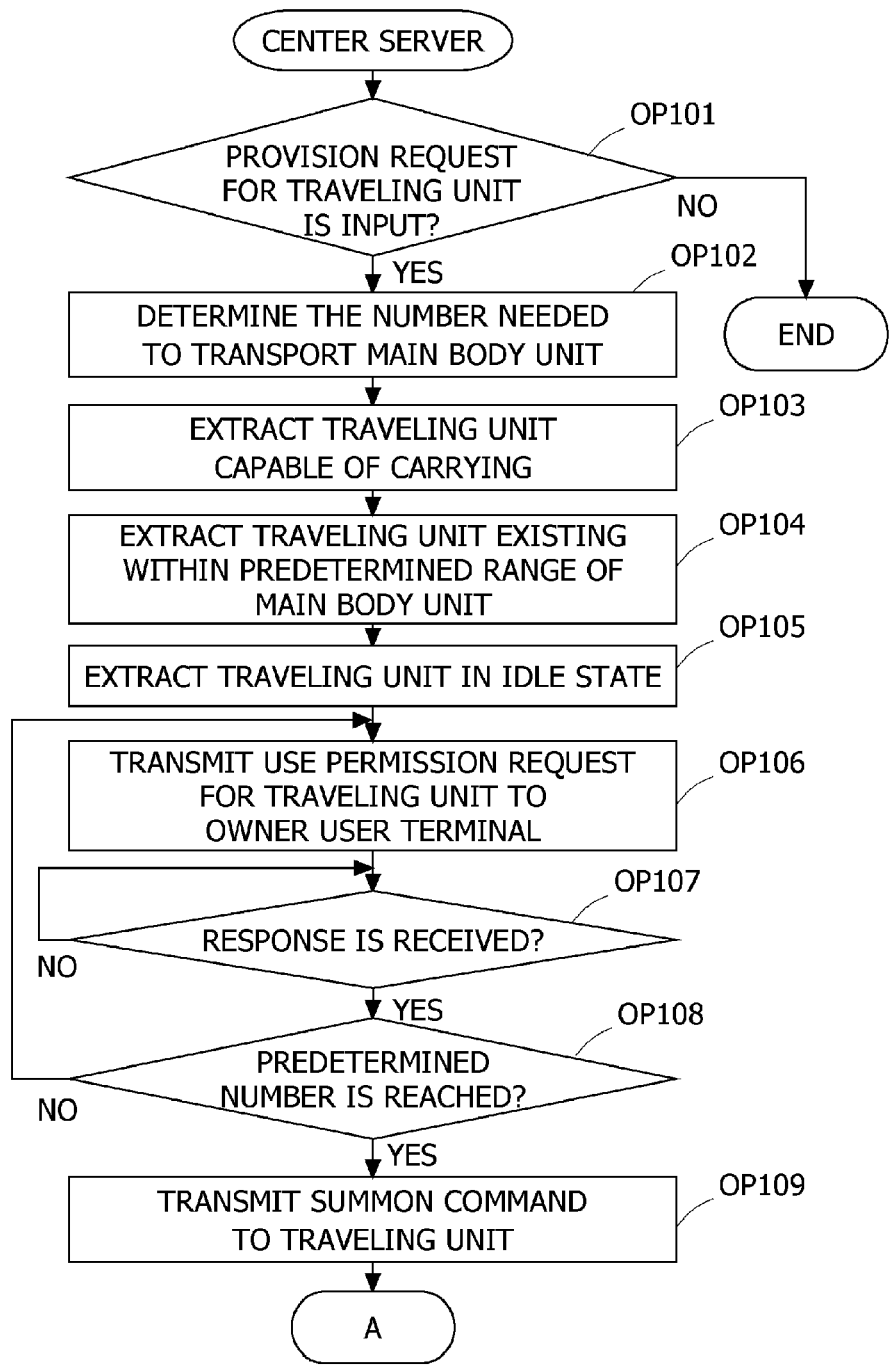

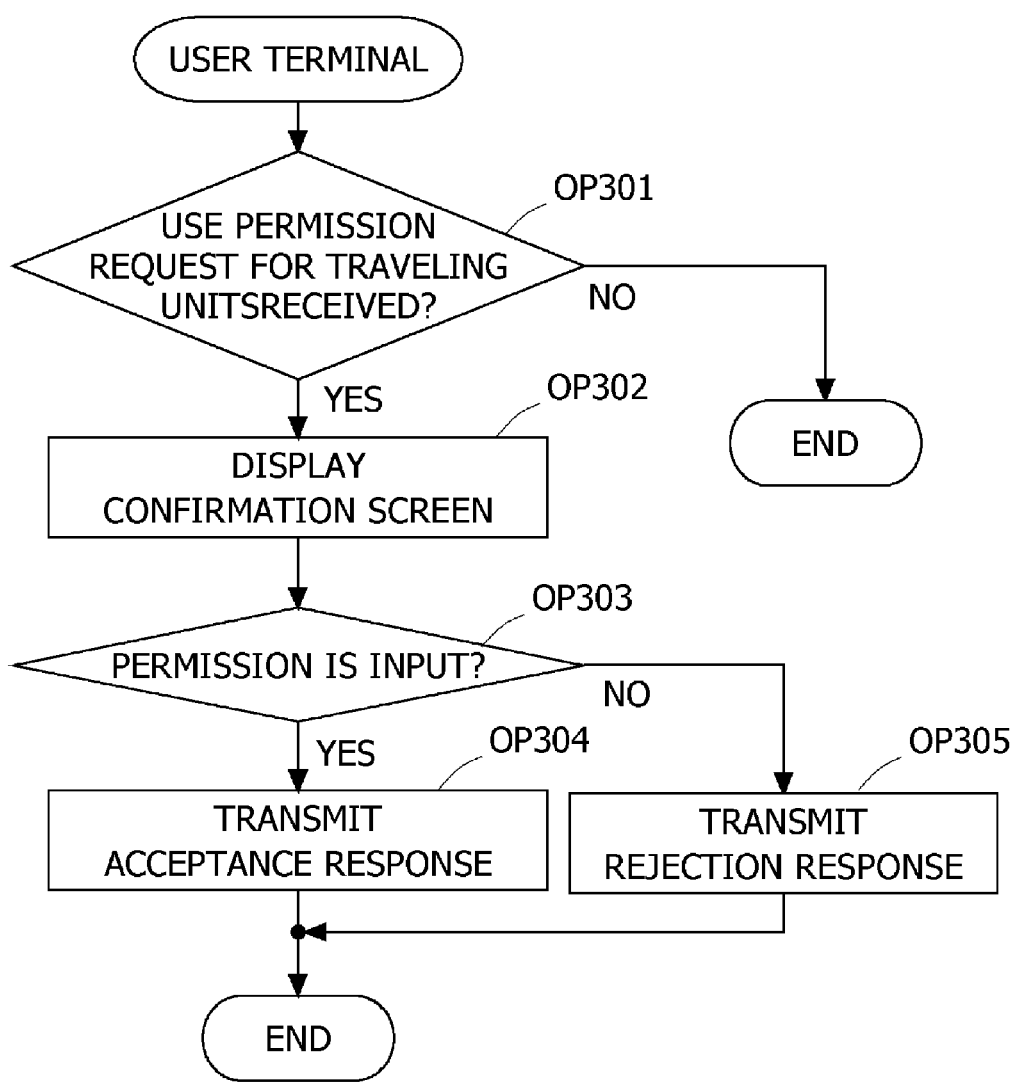

INFORMATION PROCESSING APPARATUS, INFORMATION PROCESSING METHOD, AND RECORDING MEDIUM

CROSS REFERENCE TO RELATED APPLICATION

This application claims the benefit of Japanese Patent Application No. 2019-208010, filed on Nov. 18, 2019, which is hereby incorporated by reference herein in its entirety.

BACKGROUND

Technical Field

The present disclosure relates to an information processing apparatus, an information processing method, and a recording medium.

Description of the Related Art

In relation to a disaster relief vehicle used to perform relief activities by transporting a rescue facility to an affected area at a time of occurrence of a disaster such as an earthquake, there is disclosed a technology of equipping an inside of a container with an arbitrary rescue facility needed for relief activities, the container being freely loadable/unloadable by a cargo-handling apparatus that is mounted on a vehicle (for example, Patent document 1).

CITATION LIST

Patent document

[Patent document 1] Japanese Patent Laid-Open No. 1998-59056

For example, when a disaster strikes, a large amount of relief supplies has to be transported, and there is a possible shortage of vehicles for carrying the relief supplies.

An aspect of the disclosure is aimed at providing an information processing apparatus, an information processing method, and a recording medium recorded with a program capable of covering a shortage of mobile bodies that form vehicles by being coupled with main body units.

SUMMARY

One aspect of the present disclosure is an information processing apparatus comprising:
a memory configured to store information about mobile bodies, each of which forms a vehicle by being coupled with a main body unit and is capable of autonomous driving; and
a processor configured to
transmit a summon command to a first mobile body existing within a predetermined range, the summon command summoning the first mobile body to a predetermined assembly location, and
cause a predetermined number of first mobile bodies assembled at the predetermined assembly location to carry one first main body unit that is larger or heavier than a main body unit that can be carried by one first mobile body, and to cause the predetermined number of the first mobile bodies to move to a predetermined destination.

Another aspect of the present disclosure is an information processing method comprising:
storing, in a memory, information about mobile bodies, each of which forms a vehicle by being coupled with a main body unit and is capable of autonomous driving:
transmitting a summon command to a first mobile body existing within a predetermined range, the summon command summoning the first mobile body to a predetermined assembly location; and
causing a predetermined number of first mobile bodies assembled at the predetermined assembly location to carry one first main body unit that is larger or heavier than a main body unit that can be carried by one first mobile body, and causing the predetermined number of the first mobile bodies to move to a predetermined destination.

Another aspect of the present disclosure is a non-transitory computer-readable recording medium recorded with an information processing program for causing a user terminal to:
receive a use permission request for a mobile body that is owned by an owner of the user terminal, that forms a vehicle by being coupled with a main body unit, and that is capable of autonomous driving; and
transmit a response to the use permission request, wherein the use permission request requests for a permission to use the mobile body as a first mobile body, in a case where one first main body unit that is larger or heavier than a main body unit that can be carried by one first mobile body is to be carried and moved by a predetermined number of first mobile bodies existing within a predetermined range.

According to the present disclosure, mobile bodies that form vehicles by being coupled with main body units may be replenished.

BRIEF DESCRIPTION OF DRAWINGS

FIG. 8 is an example of a traveling-unit information table that is stored in the traveling-unit information database of the center server;

FIG. 9A is an example of flowcharts of a summoning process for the traveling unit performed by the center server;

FIG. 10 is an example of a flowchart of a process, by the user terminal, related to a use permission request for the traveling unit.

DESCRIPTION OF THE EMBODIMENTS

Figure 1:
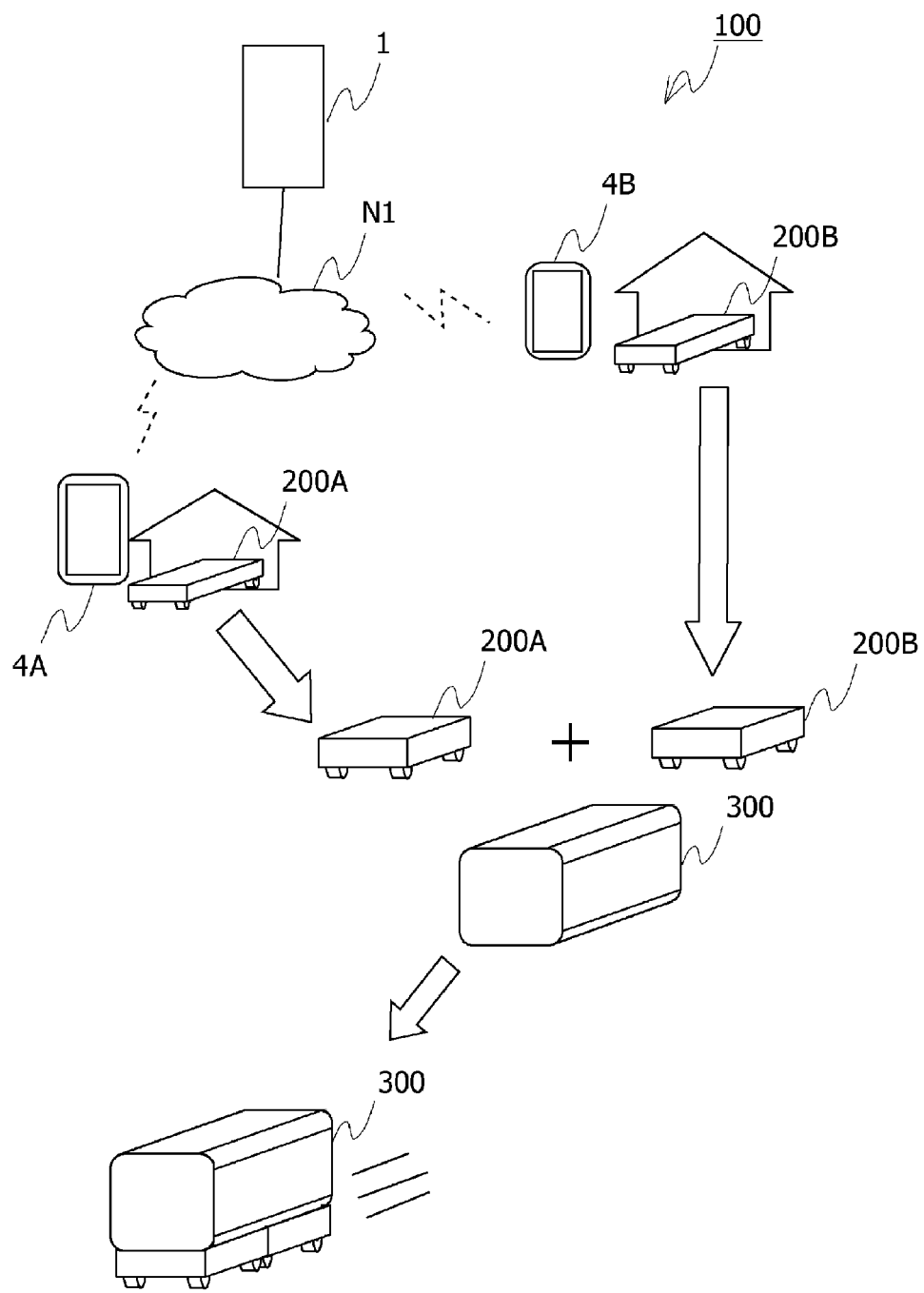
FIG. 1 is a diagram illustrating an example of a system configuration of a traveling-unit summoning system according to a first embodiment.

An aspect of the present disclosure is an information processing apparatus including a memory and a processor. The memory stores information about mobile bodies, each of which forms a vehicle by being coupled with a main body unit and is capable of autonomous driving. The processor is configured to transmit a summon command to a first mobile body existing within a predetermined range, the summon command summoning the first mobile body to a predetermined assembly location, and to cause a predetermined number of first mobile bodies assembled at the predetermined assembly location to carry one first main body unit that is larger or heavier than a main body unit that can be carried by one first mobile body, and to cause the predetermined number of the first mobile bodies to move to a predetermined destination.

The mobile body is a traveling unit provided with wheels, or a flying object such as a drone provided with a propeller, for example. A first mobile body is a mobile body that is owned by an individual user, and is provided by the user, for example. Information about the mobile body stored in the memory includes position information of the mobile body, a state of the mobile body, and the like, for example. A state of the mobile body may be a state of being used or an idle state, and the like, for example. However, information about the mobile body and the state of the mobile body are not limited to the above. The first main body unit is a main body unit equipped with special facilities, a container or the like, for example.

According to one aspect of the present disclosure, the first main body unit having such a size or weight so as not to be transportable by one first mobile body is enabled to be transported by a predetermined number of first mobile bodies. For example, in case of a disaster or the like, a demand for main body units equipped with special facilities for coping with the disaster increases. However, such a main body unit is often large or heavy, and in many cases, a mobile body for transporting such a main body unit is also of a special type, and mobile bodies for transporting such a mobile body are expected to be in short supply. According to one aspect of the present disclosure, for example, even in a situation where a shortage of mobile bodies is expected to occur, as at the time of a disaster, mobile bodies for transporting the first main body unit equipped with special facilities may be secured.

According to one aspect of the present disclosure, when the predetermined number of first mobile bodies carrying the first main body unit are no longer being used, the processor may transmit a dismiss command to the predetermined number of first mobile bodies, the dismiss command instructing movement to respective return locations. The return location of the first mobile body is a location that is set in advance, such as an address of a user who owns the first mobile body, for example. The predetermined number of first mobile bodies that completed transport of the first main body unit, for example, may thus be returned to the return locations.

According to one aspect of the present disclosure, the information about the mobile body stored in the memory may include information indicating a state of the mobile body. In this case, the processor may transmit the summon command by taking a mobile body that exists within the predetermined range and that is in an idle state as the first mobile body. Alternatively, according to one aspect of the present disclosure, the predetermined number of first mobile bodies that are assembled at the predetermined assembly location may be mobile bodies that are in the idle state at a time of reception of the summon command. Mobile bodies in the idle state may thus be effectively used.

According to one aspect of the present disclosure, the mobile body may be a mobile body that is owned by a predetermined user as a private-use vehicle. The processor may be configured to transmit a use permission request for the first mobile body, to a user terminal of a user who owns the first mobile body, and to transmit the summon command to the first mobile body, in a case where a use acceptance response regarding the first mobile body is received from the user terminal. The first mobile body may thus be used to transport the first main body unit with an approval from the user who owns the first mobile body.

According to one aspect of the present disclosure, the predetermined number of first mobile bodies may move and carry the first main body unit by convoy-traveling. When the predetermined number of first mobile bodies travel in a convoy, the predetermined number of first mobile bodies do not have to be physically coupled, and thus, a mobile body not including a physical coupling mechanism may also be used as the first mobile body.

Furthermore, in this case, the processor may control each of the predetermined number of first mobile bodies in relation to the convoy-traveling. The information processing apparatus holds information about each first mobile body, and thus, when the information processing apparatus controls the convoy-traveling of the predetermined number of first mobile bodies, control may be efficiently performed. "Efficiently" here means a reduction in time related to control related to the convoy-traveling, or a reduction in a processing load on each first mobile body, for example.

According to one aspect of the present disclosure, the processor may be configured to select from the predetermined number of first mobile bodies, according to a predetermined condition, a mobile body to be a leader of the convoy-traveling at a time of moving and carrying the first main body unit. In this case, the predetermined number of first mobile bodies may perform vehicle-to-vehicle communication with one another, and perform convoy-traveling according to an instruction from the mobile body selected as the leader. Because the information processing apparatus holds information about each first mobile body, a first mobile body to be the leader may be swiftly selected. Furthermore, the information processing apparatus does not have to perform control regarding the convoy-traveling for each of the predetermined number of first mobile bodies, and thus, a processing load on the information processing apparatus may be reduced.

According to one aspect of the present disclosure, the predetermined number of first mobile bodies may perform vehicle-to-vehicle communication with one another, select a first mobile body that is to be a leader, and perform convoy-traveling. In this case, because the information processing apparatus does not have to perform control regarding convoy-traveling of the predetermined number of first mobile bodies, a load on the information processing apparatus may be reduced.

According to one aspect of the present disclosure, the processor may determine the predetermined number regarding the first mobile bodies that move and carry the first main body unit, based on the information about the mobile body. Flexible handling according to the type of the first main body unit may thus be enabled.

In the following, an embodiment of the present disclosure will be described with reference to the drawings. The configuration of the embodiment described below is an example, and the present disclosure is not limited to the configuration of the embodiment.

First Embodiment

FIG. 1 is a diagram illustrating an example of a system configuration of a traveling-unit summoning system 100 according to a first embodiment. For example, the traveling-unit summoning system 100 is a system related to a vehicle where a traveling unit and a main body unit can be separated or coupled with each other, the system being for summoning a plurality of traveling units owned by individual users, and causing the plurality of summoned traveling units to be coupled with one main body unit to perform transport.

For example, the traveling-unit summoning system 100 includes a center server 1, traveling units 200, user terminals 4 of users who own the traveling unit 200, and a main body unit 300. A user terminal 4 is a user terminal of a user who provides a traveling unit 200 to the traveling-unit summoning system 100, and an application for using the traveling-unit summoning system 100 is installed in the user terminal 4. The main body unit 300 may be owned by an administrator of the center server 1, or may be owned by a user other than the administrator of the center server 1, a predetermined organization or the like.

FIG. 1 illustrates traveling units 200A, 200B. A user terminal 4A is a user terminal of an owner of the traveling unit 200A. A user terminal 4B is a user terminal of an owner of the traveling unit 200B. In the following, in the case of not distinguishing between the traveling units 200A and 200B, and between the user terminals 4A and 4B, terms "traveling unit(s) 200" and "user terminal(s) 4" will be used. Additionally, the traveling units 200 and the user terminals 4 included in the traveling-unit summoning system 100 are not limited to the traveling units 200A, 200B and the user terminals 4A, 4B.

For example, the center server 1 and the user terminal 4 are connected to a network N1 such as the Internet, and are capable of communicating over the network N1. Furthermore, in the first embodiment, the traveling unit 200 includes a communication function, and is capable of communicating with the center server 1 and the user terminal 4 of the owner over the network N1, for example. The main body unit 300 may also include a communication function, and may communicate with the center server 1 over the network N1.

The traveling unit 200 is a household traveling unit that is categorized as a standard-sized vehicle by the Road Traffic law. A main body unit that can be transported by the traveling unit 200 is a main body unit that weighs less than 3.5 tons when coupled with the traveling unit 200. For its part, the main body unit 300 is a main body unit equipped with special facilities such as fire-fighting facilities, medical facilities, temporary housing facilities, or bathing facilities, or a container in which aid supplies are loaded, for example. The main body unit 300 weighs 3.5 tons or more, for example, and is, in many cases, categorized as a mid-sized or larger vehicle by the Road Traffic law when coupled with a traveling unit. Accordingly, a traveling unit that is capable of transporting the main body unit 300 has to have performance equal to or better than that of a mid-sized vehicle.

However, when a disaster or an accident occurs, a demand for the main body unit 300 increases, and traveling units capable of transporting the main body unit 300 are expected to run short. It is conceivable to borrow a traveling unit capable of transporting the main body unit 300 from another region, but the traveling unit possibly does not arrive in time for rescue operations due to movement taking too long, for example. Accordingly, in the first embodiment, in a case where there is a shortage of traveling units capable of transporting the main body unit 300, one main body unit 300 is transported by a plurality of traveling units 200 that are passenger vehicles existing within a predetermined range.

In the first embodiment, the center server 1 receives input of a provision request for a traveling unit 200. For example, when a disaster or the like strikes, the provision request for a traveling unit 200 is transmitted to the center server 1 from a relevant ministry or local authority or is input to the center server 1 by an administrator of the center server 1 upon the administrator being contacted. Information about a main body unit 300 that is a transport target is also input to the center server 1, together with the provision request for a traveling unit 200. Information about the main body unit 300 includes the type, weight, size, existing location and the like of the main body unit 300.

When input of the provision request for a traveling unit 200 is received, the center server 1 transmits a summon command to a traveling unit 200 present within a predetermined range, and causes a predetermined number of traveling units 200 to be assemble at an assembly location. A target region of summons is a range within a predetermined distance from the assembly location, or a city, ward, town, village or the like including the assembly location, for example. The assembly location is the existing location of the main body unit 300, or a location specified by a requesting body, for example.

When a predetermined number of traveling units 200 are assembled at the assembly location, the center server 1 causes the main body unit 300 to be loaded on the predetermined number of traveling units 200, and causes the traveling units 200 to move to a predetermined destination. For example, in a case where the summon command is transmitted to the traveling unit 200A and the traveling unit 200B, the traveling unit 200A and the traveling unit 200B move to the assembly location, and move to the destination after having the main body unit 300 loaded at the assembly location. The traveling unit 200A and the traveling unit 200B may transport the main body unit 300 by being physically coupled with each other, or may transport the main body unit 300 by traveling in a convoy, without being physically coupled with each other.

For example, when the predetermined number of traveling units 200 carrying the main body unit 300 are determined to have arrived at the destination, the center server 1 causes the main body unit 300 to be unloaded. Then, the center server 1 transmits a dismiss command to the predetermined number of traveling units 200. When the dismiss command is received, the traveling unit 200A and the traveling unit 200B move to respective return locations. The return location is the address of an owner of the traveling unit 200, for example.

In the first embodiment, when there is a shortage of traveling units capable of transporting the main body unit 300, traveling units 200 that are passenger vehicles present in a periphery of the main body unit 300 are assembled, and the main body unit 300 is transported by a plurality of traveling units 200. The shortage of traveling units capable of transporting the main body unit 300 may thus be covered by a plurality of traveling units 200 that are passenger vehicles. Furthermore, in case of emergency such as a disaster, needed facilities and supplies may be swiftly transported to an affected area.

<Separable Vehicle>

Figure 2:
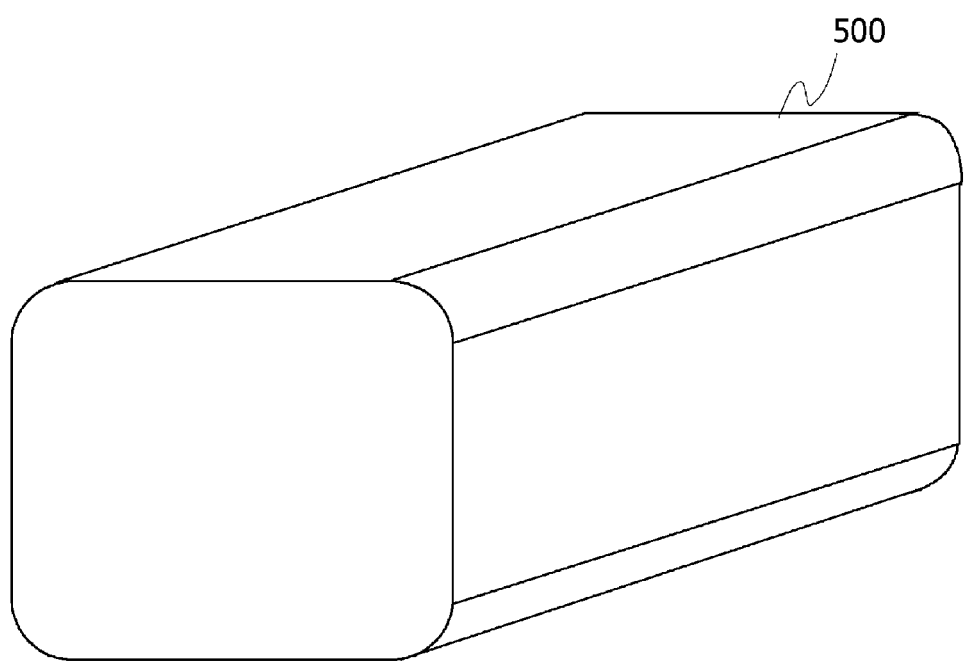
FIG. 2 is a diagram illustrating an example of a separable vehicle.
Figure 2:
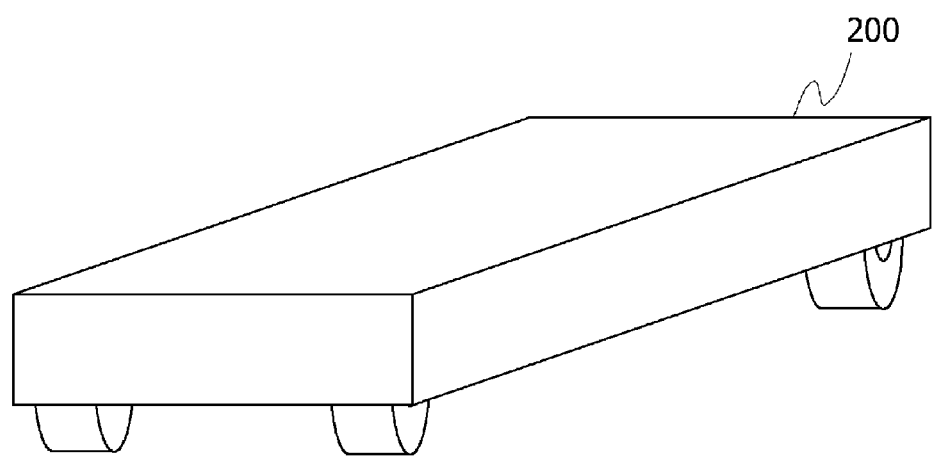

FIG. 2 is a diagram illustrating an example of a separable vehicle. In the first embodiment, a separable vehicle that separates into the main body unit and the traveling unit is assumed to be used. A main body unit 500 and the traveling unit 200 illustrated in FIG. 2, when coupled, form a vehicle that is categorized as a standard-sized vehicle by the Road Traffic law, for example. The main body unit 500 is a main body unit that is of a different type from the main body unit 300, and that is lighter or smaller than the main body unit 300, for example. Under normal circumstances, the traveling unit 200 is coupled with the main body unit 500 to be used as a private-use vehicle.

For example, as illustrated in FIG. 2, the separable vehicle may be a vertically separable vehicle having the main body unit 500 loaded on the traveling unit 200. However, the separable vehicle is not limited to the vertically separable vehicle. For example, a front-back separable vehicle where the traveling unit is coupled to a front of the main body unit and travels while pulling the main body unit may also be used. The traveling unit 200 and the main body unit 500 are coupled together by a predetermined method. A coupling method of the traveling unit 200 and the main body unit 500 is not limited to a specific method, and any existing technique may be used. For example, the coupling method of the traveling unit 200 and the main body unit 500 may use a coupling/separating mechanism, electromagnets or the like. Moreover, in relation to the vertically separable vehicle, a method of loading or unloading the main body unit 500 from the traveling unit 200 may be a method that uses a dedicated lift, or a method that uses a loading/unloading mechanism that is provided at the main body unit 500 or the traveling unit 200 itself, for example. In relation to the vertically separable vehicle, the method of loading or unloading the main body unit 500 from the traveling unit 200 is not limited to a specific method.

Figure 3:
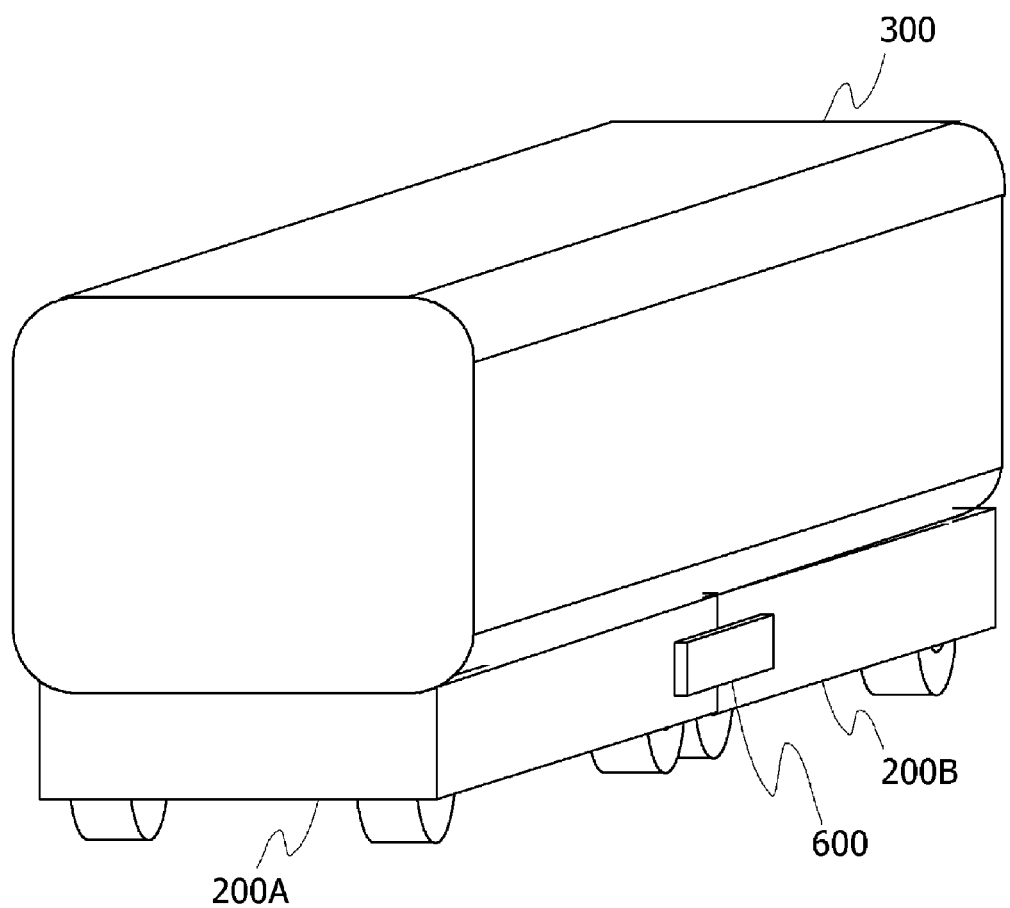
FIG. 3 is a diagram illustrating an example of a transport method used in a case of transporting the main body unit by a plurality of traveling units.

FIG. 3 is a diagram illustrating an example of a transport method used in a case of transporting the main body unit 300 by a plurality of traveling units 200. For example, the main body unit 300 weighs 3.5 tons or more, and forms a vehicle that is categorized as a mid-sized or larger vehicle by the Road Traffic law. For example, the traveling unit 200 is a traveling unit that is capable of transporting the main body unit 500 that forms a vehicle that is categorized as a standard-sized vehicle by the Road Traffic law.

FIG. 3 illustrates an example in which two traveling units 200, namely, the traveling unit 200A and the traveling unit 200B, are physically coupled together by a coupling mechanism 600 to thereby carry and transport the main body unit 300. Additionally, the coupling mechanism 600 for the traveling unit 200A and the traveling unit 200B is merely an example, and is not limited to the one illustrated in FIG. 3. Furthermore, a method of loading the main body unit 300 on the traveling unit 200A and the traveling unit 200B that are coupled together may be a method that uses a lift or the like, or a method that uses a loading/unloading mechanism that is provided at the main body unit 300 or the traveling unit 200 itself, for example. Furthermore, a coupling method of the traveling unit 200A and the traveling unit 200B that are coupled together, and the main body unit 300 may use a coupling/separating mechanism, electromagnets or the like.

Figure 4:
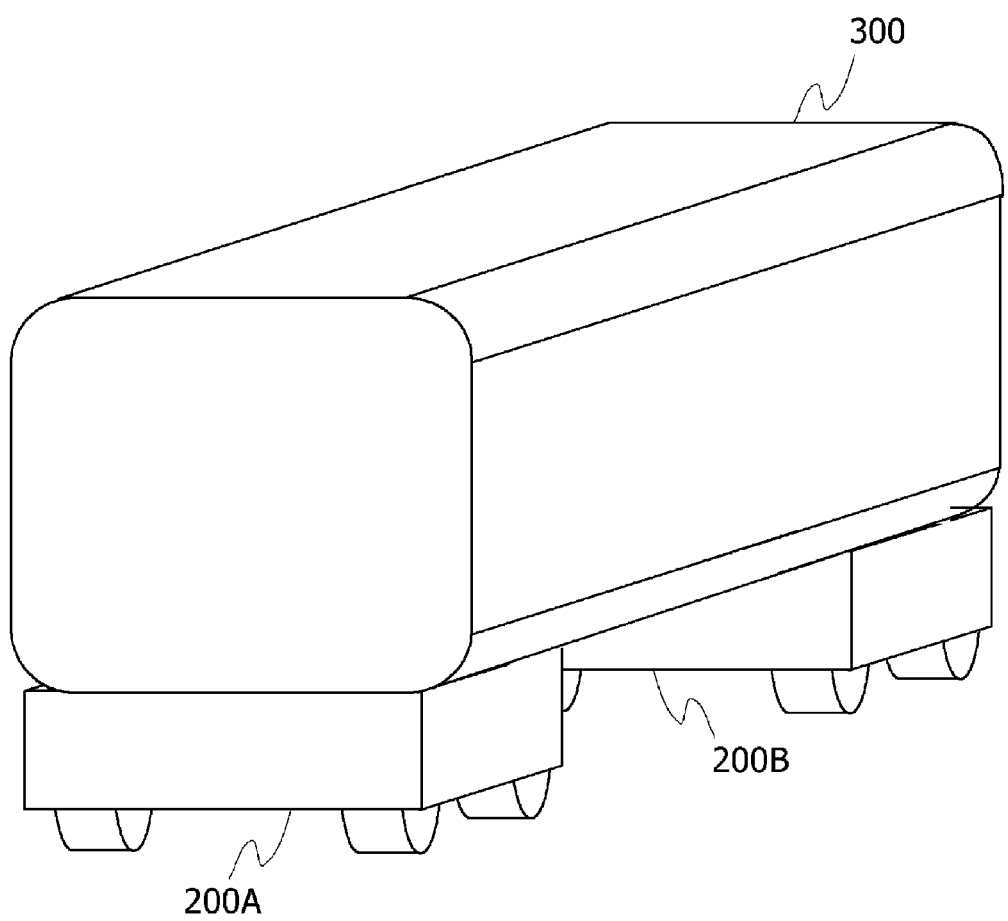
FIG. 4 is a diagram illustrating another example of the transport method used in the case of transporting the main body unit by a plurality of traveling units.

FIG. 4 is a diagram illustrating another example of the transport method used in the case of transporting the main body unit 300 by a plurality of traveling units 200. FIG. 4 illustrates an example in which two traveling units 200, namely, the traveling unit 200A and the traveling unit 200B, travel in a convoy without being physically coupled together, to thereby carry and transport the main body unit 300.

For example, convoy-traveling of the traveling units 200 may be performed by the center server 1 controlling each traveling unit 200, or may be performed by communication between the traveling units 200 without using the center server 1. As communication between the traveling units 200, there is vehicle-to-vehicle communication, for example. In the case where convoy-traveling is performed by communication between the traveling units 200, the traveling unit 200 as a leader that controls convoy-traveling may be determined by the center server 1, or may be determined by exchange of information through communication between the traveling units 200. The traveling unit 200 to be the leader of convoy-traveling is selected on the basis of one or a plurality of criteria among a size of battery capacity, whether a function of communicating with the center server 1 is included or not, a level of performance, a remaining capacity of battery and the like, for example. The leader of convoy-traveling may be switched to another traveling unit 200 during traveling.

In the case where convoy-traveling of the traveling units 200 is controlled by the center server 1, a control method of convoy-traveling of the traveling units 200 by the center server 1 may be any of existing control methods, and is not limited to a specific method. In the case where convoy-traveling of the traveling units 200 is controlled through communication between the traveling units 200, a control method of the convoy-traveling may be any of existing methods, and is not limited to a specific method.

Furthermore, whether convoy-traveling is controlled by the center server 1 or through communication between the traveling units 200 may be fixed or may be switched depending on which traveling units 200 are assembled. Additionally, the number of traveling units 200 that are prepared for one main body unit 300 is not limited to two, and is determined taking into account sizes, equipment and the like of the main body unit 300 and each traveling unit 200.

Figure 5:
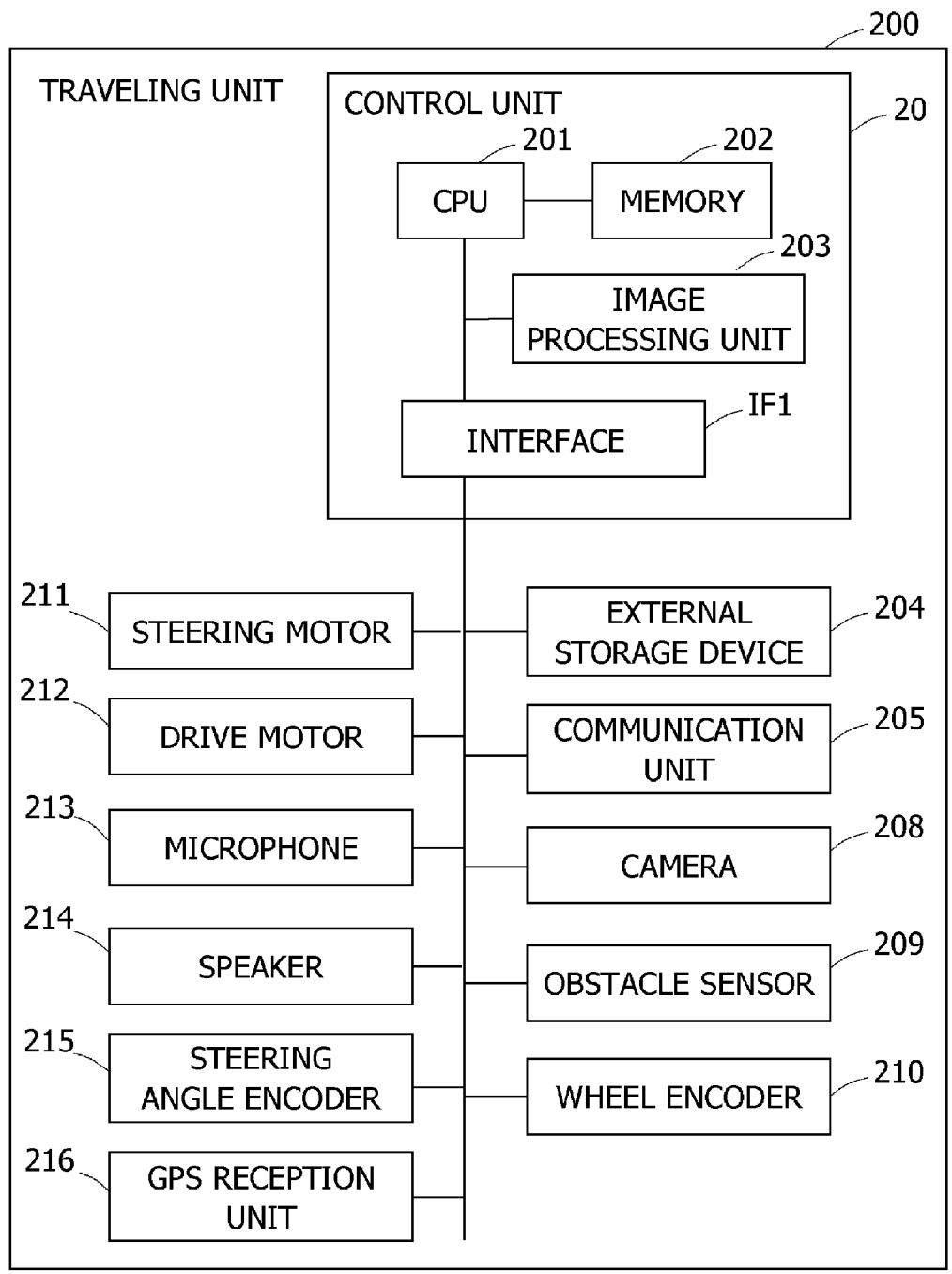
FIG. 5 is a diagram illustrating an example hardware configuration of the traveling unit.

FIG. 5 is a diagram illustrating an example hardware configuration of the traveling unit 200. In the first embodiment, the traveling unit 200 is assumed to be an electric vehicle that is capable of autonomous driving. Accordingly, FIG. 5 is a diagram of a case where the traveling unit 200 is assumed to be an electric vehicle that is capable of autonomous driving. Additionally, in FIG. 5, hardware related to a control system of the traveling unit 200 is extracted and illustrated.

For example, the traveling unit 200 includes a control unit 20, an external storage device 204, a communication unit 205, a camera 208, an obstacle sensor 209, a wheel encoder 210, a steering motor 211, a drive motor 212, a microphone 213, a speaker 214, a steering angle encoder 215, and a global positioning system (GPS) reception unit 216.

The control unit 20 is also referred to as an electronic control unit (ECU). The control unit 20 includes a CPU 201, a memory 202, an image processing unit 203, and an interface IF1. The external storage device 204, the communication unit 205, the camera 208, the obstacle sensor 209, the wheel encoder 210, the steering motor 211, the drive motor 212, the microphone 213, the speaker 214, the steering angle encoder 215, and the GPS reception unit 216 are connected to the interface IF1.

The obstacle sensor 209 is an ultrasonic sensor, a radar or the like. The obstacle sensor 209 transmits ultrasonic waves, electromagnetic waves or the like in a detection target direction, and detects, on the basis of reflected waves, presence, position, relative speed and the like of an obstacle in the detection target direction. Obstacles include pedestrians, bicycles, structures, buildings and the like, for example. In the case where the traveling unit 200 is box-shaped, as illustrated in FIG. 2, a plurality of obstacle sensors 209 are provided, and the plurality of obstacle sensors 209 are provided at positions near four front, back, left and right corner portions of the traveling unit 200, for example. Additionally, the front, back, left and right of the traveling unit 200 are determined on the basis of a traveling direction, for example.

The camera 208 is a capturing device that uses an image sensor such as a charged-coupled device (CCD), a metal-oxide-semiconductor (MOS), a complementary metal-oxide-semiconductor (CMOS) or the like. The camera 208 acquires an image every predetermined period called frame period, and stores the image in a frame buffer in the control unit 20. A plurality of cameras 208 are provided on the traveling unit 200, and the plurality of cameras 208 are installed on front, back, left and right side surfaces of the traveling unit 200 while facing outward, for example.

The steering motor 211 controls, according to an instruction signal from the control unit 20, an angle of a direction of an intersecting line along which a rotating surface of a wheel and a horizontal plane intersect, or in other words, a traveling direction of rotation of the wheel. The drive motor 212 drives and rotates each wheel provided on the traveling unit 200, according to an instruction signal from the control unit 20, for example. The drive motor 212 may drive one pair of wheels among two pairs of front and rear wheels.

The steering angle encoder 215 detects a steering angle that is the traveling direction of a wheel at predetermined detection time intervals, and stores the steering angle in a register of the control unit 20. The steering angle is an angle of a rotation axis of the wheel on the horizontal plane. For example, an origin of the angle is set at which a direction of the rotation axis of the wheel is perpendicular to the traveling direction of the traveling unit 200. Furthermore, the wheel encoder 210 acquires a rotation angle of the wheel at predetermined detection time intervals, and stores the rotation angle in the register of the control unit 20.

The communication unit 205 is a communication unit that connects to a WiFi access point or a mobile phone base station, for example, and that communicates with various servers and the like on a network through a public communication network connected to the WiFi access point or the mobile phone base station. The communication unit 205 performs wireless communication using wireless signals and a wireless communication method according to a predetermined wireless communication standard.

The GPS reception unit 216 receives radio waves carrying time signals from a plurality of global positioning satellites orbiting the Earth, and stores the time signals in the register of the control unit 20. The microphone 213 detects sound, converts the sound into a digital signal, and stores the digital signal in the register of the control unit 20. The speaker 214 is driven by a D/A converter and an amplifier connected to the control unit 20 or a signal processing unit, and reproduces acoustics including sound and voice.

The CPU 201 of the control unit 20 executes a computer program that is loaded into the memory 202 in an executable manner, and performs processing as the control unit 20. The memory 202 stores computer programs to be executed by the CPU 201, data to be processed by the CPU 201, and the like. For example, the memory 202 is a dynamic random access memory (DRAM), a static random access memory (SRAM), a read only memory (ROM) or the like. The image processing unit 203 processes, in coordination with the CPU 201, data in the frame buffer that is acquired from the camera 208 every predetermined frame period. The image processing unit 203 includes a GPU and an image memory as the frame buffer, for example. The external storage device 204 is a non-volatile memory, and is a solid state drive (SSD), a hard disk drive or the like, for example.

For example, the control unit 20 acquires detection signals from a sensor of each unit of the traveling unit 200 via the interface IF1. Furthermore, the control unit 20 calculates latitude and longitude indicating a position on the Earth, from detection signals from the GPS reception unit 216. Furthermore, the control unit 20 acquires map data from a map information database stored in the external storage device 204, checks the calculated latitude and longitude against a position in the map data, and determines a current location. Moreover, the control unit 20 acquires a route from the current location to a destination in the map data. Moreover, the control unit 20 detects an obstacle in the surroundings of the traveling unit 200 on the basis of a signal from the obstacle sensor 209, the camera 208 or the like, determines the traveling direction to avoid the obstacle, and controls the steering angle.

Furthermore, the control unit 20 processes, in coordination with the image processing unit 203, an image acquired from the camera 208, on a per-frame data basis, detects a change on the basis of a difference between images, for example, and recognizes an obstacle. Additionally, the control unit 20 may transmit frame data of an image from the camera 208 and audio data obtained from the microphone 213, from the communication unit 205 to the center server 1 on a network. Then, analysis of the frame data of the image and the audio data may be assigned to the center server 1.

FIG. 5 illustrates the interface IF1, but exchange of signals between the control unit 20 and a control target is not limited to be performed through the interface IF1. That is, the control unit 20 may include a plurality of signal exchange paths other than the interface IF1. Furthermore, in FIG. 5, the control unit 20 includes a single CPU 201. However, the CPU is not limited to a single processor, and may have a multi-processor configuration. Alternatively, a single CPU connected by a single socket may have a multi-core configuration. At least a part of processes by each unit described above may be performed by a processor other than the CPU, such as a dedicated processor such as a digital signal processor (DSP) or a graphics processing unit (GPU), for example. Furthermore, at least a part of processes by each unit described above may be performed by an integrated circuit (IC) or another digital circuit. An analog circuit may be included in at least one of the units described above.

<Device Configuration>

Figure 6:
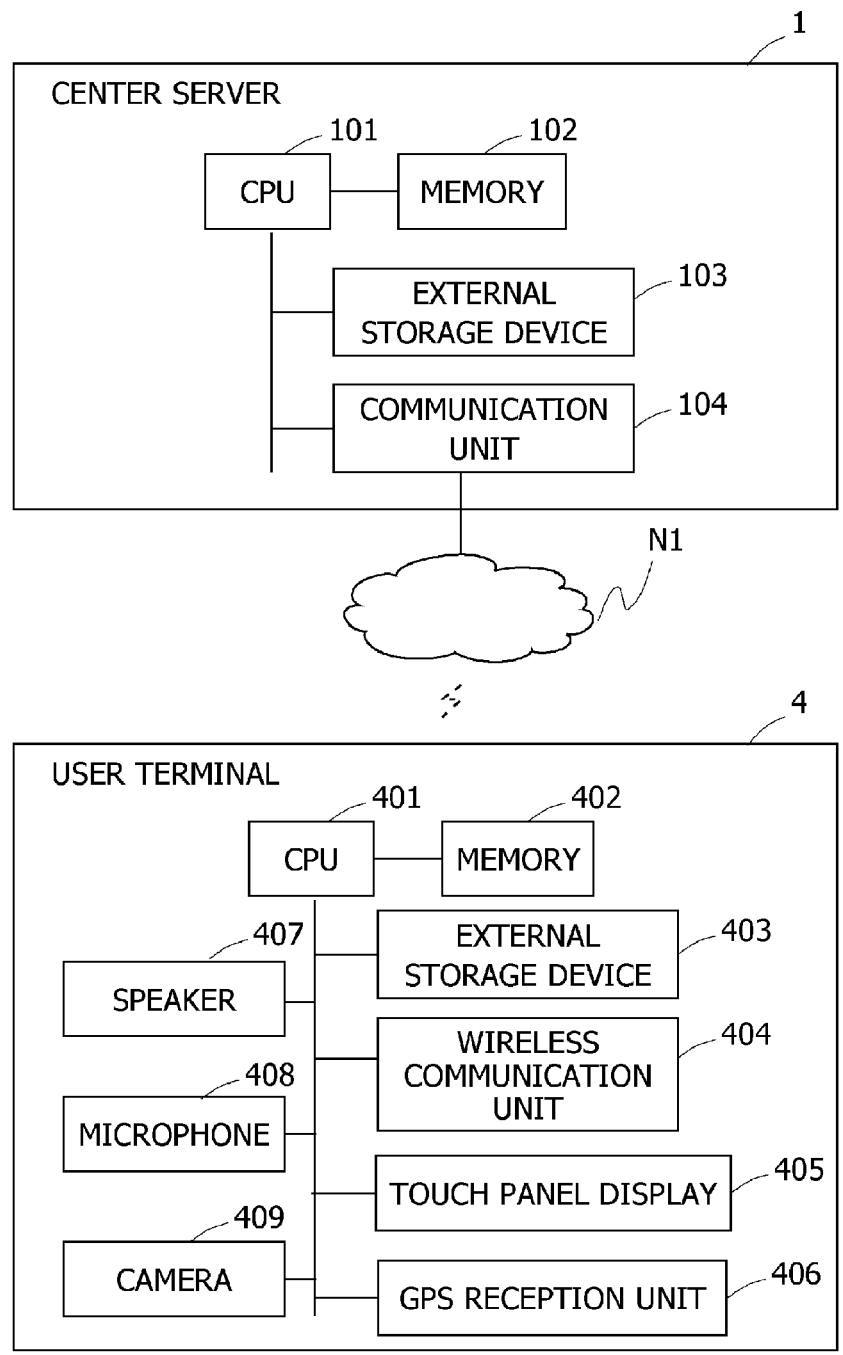
FIG. 6 is a diagram illustrating an example hardware configuration of the center server according to the first embodiment.

FIG. 6 is a diagram illustrating an example hardware configuration of the center server 1 according to the first embodiment. For example, the center server 1 is a dedicated computer or a general-purpose computer. As hardware configuration, the center server 1 includes a central processing unit (CPU) 101, a memory 102, an external storage device 103, and a communication unit 104. The memory 102 and the external storage device 103 are computer-readable recording media. The center server 1 is an example of "information processing apparatus".

The external storage device 103 stores various programs, and data that is used by the CPU 101 at the time of execution of each program. For example, the external storage device 103 is an erasable programmable ROM (EPROM) or a hard disk drive. Programs held in the external storage device 103 include the operating system (OS), a control program of the traveling-unit summoning system 100, and various other application programs, for example. The control program of the traveling-unit summoning system 100 is a program for causing traveling units 200 present within a predetermined range to move to the assembly location, when a request is received, and for causing a plurality of traveling units 200 to transport the main body unit 300 to a destination.

The memory 102 is a main memory that provides a storage area and a work area for loading programs stored in the external storage device 103, and that is used as a buffer. For example, the memory 102 includes a semiconductor memory such as a read only memory (ROM) or a random access memory (RAM).

The CPU 101 performs various processes by loading the OS and various application programs held in the external storage device 103 into the memory 102 and executing the same. The number of CPUs 101 is not limited to one, and a plurality of CPUs may be provided. The CPU 101 is an example of "processor" of "information processing apparatus".

The communication unit 104 is an interface through which information is input/output from a network. The communication unit 104 may be an interface that is connected to a cable network, or may be an interface that is connected to a wireless network. For example, the communication unit 104 is a network interface card (NIC) or a radio circuit. For example, the communication unit 104 connects to a local area network (LAN), connects to a public network through the LAN, and communicates with various servers and the user terminals 4 on the network through the public communication network.

Additionally, the hardware configuration of the center server 1 illustrated in FIG. 6 is merely an example and is not limited to the above, and omission, replacement and addition of structural elements may be performed as appropriate according to the embodiment. For example, the center server 1 may include a removable recording medium drive device, and may execute programs recorded in a removable recording medium. The removable recording medium is a recording medium such as an SD card, a mini SD card, a micro SD card, a universal serial bus (USB) flash memory, a compact disc (CD), a digital versatile disc (DVD), a Blu-ray (registered trademark) disc, or a flash memory card, for example. Moreover, the center server 1 may include an input device and an output device, for example. The input device is a keyboard, a mouse, or a touch panel, for example. The output device is a display, for example.

Next, the user terminal 4 is a smartphone, a tablet terminal, a personal computer (PC), a wearable terminal or the like, for example. As hardware configuration, the user terminal 4 includes a CPU 401, a memory 402, an external storage device 403, a wireless communication unit 404, a touch panel display 405, a GPS reception unit 406, a speaker 407, a microphone 408, and a camera 409, for example. The CPU 401, the memory 402, and the external storage device 403 are the same as the CPU 101, the memory 102, and the external storage device 103. The GPS reception unit 406 is the same as the GPS reception unit 216. An application of the traveling-unit summoning system 100 for the user terminal 4 is stored in the external storage device 403 of the user terminal 4.

For example, the wireless communication unit 404 is a wireless communication circuit compatible with a mobile body communication network such as 5G, 4G (LTE-Advance) or 3G, or a wireless LAN such as Wi-Fi. The user terminal 4 connects to the network N1 via the wireless communication unit 404.

Additionally, a series of processes to be performed by the center server 1 and the user terminal 4 is not limited to be performed by execution of software by the processors. These processes may alternatively be performed by hardware such as a field-programmable gate array (FPGA), for example.

Figure 7:
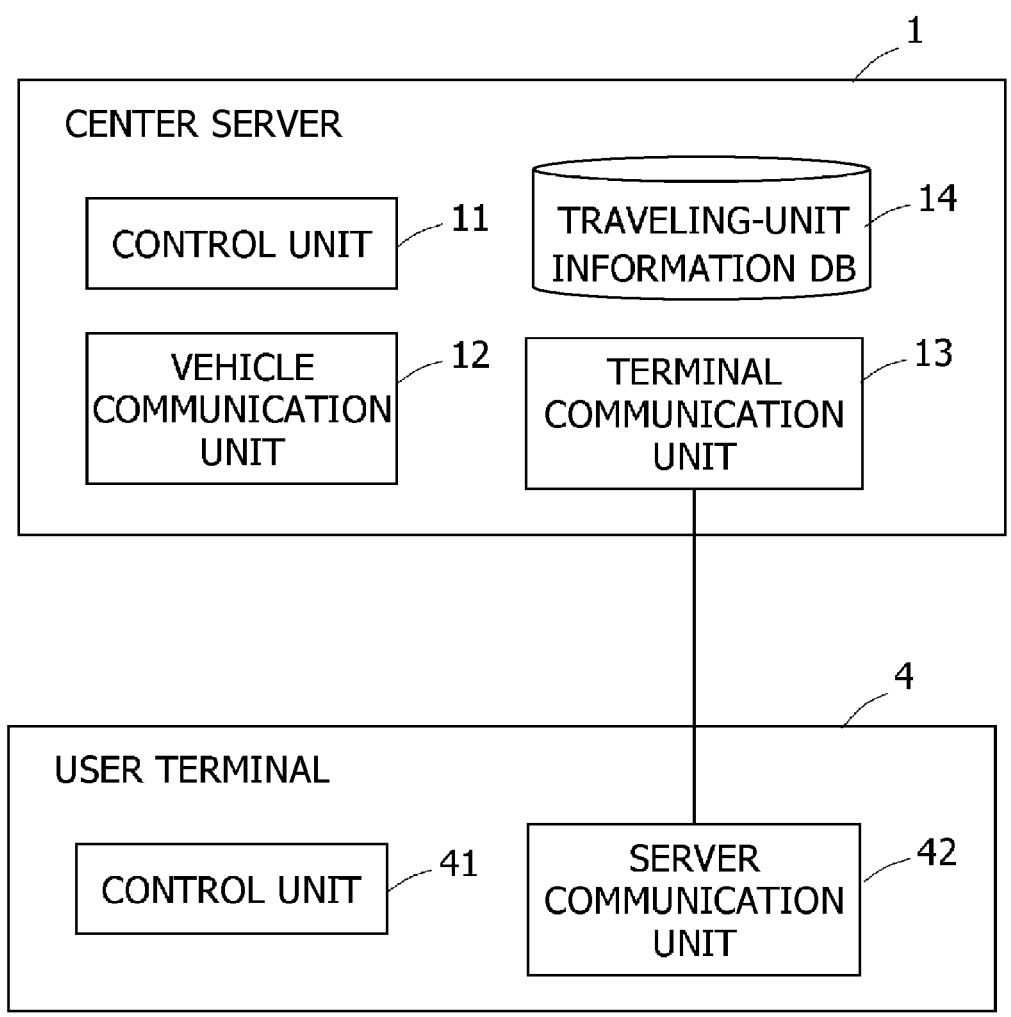
FIG. 7 is a diagram illustrating example functional configurations of the center server and the user terminal in the traveling-unit summoning system.

FIG. 7 is a diagram illustrating example functional configurations of the center server 1 and the user terminal 4 in the traveling-unit summoning system 100. As functional structural elements, the center server 1 includes a control unit 11, a vehicle communication unit 12, a terminal communication unit 13, and a traveling-unit information database (DB) 14. These functional structural elements are achieved by the CPU 101 of the center server 1 executing control programs of the traveling-unit summoning system 100 stored in the external storage device 103, for example.

The vehicle communication unit 12 is an interface for communicating with the traveling unit 200. For example, the vehicle communication unit 12 transmits data input from the control unit 11 to the traveling unit 200, through the communication unit 104. Furthermore, the vehicle communication unit 12 receives data from the traveling unit 200 through the communication unit 104, and outputs the received data to the control unit 11. Data pieces that are transmitted from the center server 1 to the traveling unit 200 include the summon command, a move command, and the dismiss command, for example. Data pieces that are received by the center server 1 from the traveling unit 200 include position information of the traveling unit 200, for example.

The terminal communication unit 13 is an interface for communicating with the user terminal 4. For example, the terminal communication unit 13 transmits data input from the control unit 11 to the user terminal 4, through the communication unit 104. Furthermore, the terminal communication unit 13 receives data from the user terminal 4 through the communication unit 104, and outputs the received data to the control unit 11. Data pieces that are transmitted from the center server 1 to the user terminal 4 include the use permission request for the traveling unit 200, for example. Data pieces that are received by the center server 1 from the user terminal 4 include a response to the use permission request for the traveling unit 200, for example.

The control unit 11 receives input of the provision request for a traveling unit 200. For example, when a disaster or the like strikes, the provision request for a traveling unit 200 is input by being transmitted to the center server 1 from a relevant ministry or local authority or by being input to the center server 1 by an administrator of the center server 1 upon the administrator being contacted. Information about the main body unit 300 is also input together with the provision request for a traveling unit 200. Information about the main body unit 300 includes information about the existing location, type, transport destination and the like of the main body unit 300.

The control unit 11 refers to information stored in the traveling-unit information DB 14, and extracts a traveling unit 200 that is capable of transporting the main body unit 300 that is the transport target. The control unit 11 also determines the number of traveling units 200 needed to transport the main body unit 300 that is the transport target. The type and number of traveling units 200 by which the main body unit 300 that is the transport target can be transported are determined on the basis of the type, weight, size and the like of the main body unit 300 that is the transport target, for example. The type and number of traveling units 200 by which the main body unit 300 that is the transport target can be transported may be set in advance, for example. Next, the control unit 11 refers to the information stored in the traveling-unit information DB 14, and further narrows down to traveling units 200 that exist within a predetermined range of the existing location of the main body unit 300 and that are in the idle state.

The control unit 11 transmits the use permission requests for the traveling units 200 to the user terminals 4 of users owning the extracted traveling units 200. The control unit 11 transmits the summon command to a traveling unit 200 in relation to which an acceptance response is received in response to the use permission request for the traveling unit 200. For example, a scheduled use period for the traveling unit 200, the assembly location, the transport destination of the main body unit 300, and the like are transmitted to the user terminal 4, together with the use permission request.

For example, the control unit 11 may select, from the extracted traveling units 200, a needed number of traveling units 200 for transport of the main body unit 300 that is the transport target, the traveling units 200 ranking high in predetermined priority, and may transmit the use permission requests for the traveling units 200 to the user terminals 4 of the owner users. In the case where the number of acceptance responses does not satisfy the number needed for transport of the main body unit 300 that is the transport target, the control unit 11 may further select enough number of traveling units 200 to cover a shortage, and may transmit the use permission request(s) for the traveling unit(s) 200 to the user terminal(s) 4 of the owner user(s). The control unit 11 repeats the process until the number of acceptance responses reaches the number needed to transport the main body unit 300 that is the transport target.

Alternatively, the control unit 11 may select one traveling unit 200 with highest priority from the extracted traveling units 200, and may transmit the use permission request for the traveling unit 200 to the user terminal 4 of the owner user of the traveling unit 200. When a response is received, the control unit 11 may select one traveling unit 200 with second highest priority, and may transmit the use permission request for the traveling unit 200 to the user terminal 4 of the owner user. The control unit 11 repeats the process until the number of acceptance responses reaches the number needed to transport the main body unit 300 that is the transport target.

The predetermined priority may be in an ascending order of distances from the existing location of the main body unit 300, or may be set on the basis of the level of performance, a remaining amount of battery, or the like, for example.

Next, the control unit 11 transmits the summon command to a plurality of traveling units 200 in relation to which acceptance responses are received from the user terminals 4 of the owner users. Information about the assembly location, an assembly time and the like is also transmitted together with the summon command. The assembly location is one of the existing location of the main body unit 300 that is the transport target, a location determined from existing locations of the plurality of traveling units 200 in relation to which acceptance responses are received from the user terminals 4 of the owner users and the existing location of the main body unit 300 that is the transport target, and the like, for example. Upon reception of the summon command, the traveling units 200 start to move to the assembly location, for example.

For example, in the case where it is detected that at least a plurality of traveling units 200 are no longer being used, the control unit 11 transmits the dismiss command to the plurality of traveling units 200. That a plurality of traveling units 200 that transported the main body unit 300 are no longer being used is detected on the basis of reception of an end-of-use notification from a user terminal of a user who issued the provision request for the traveling units 200 existing at the destination or from the traveling units 200, or on the basis of position information or the like of the traveling units 200. When the dismiss command is received, the traveling units 200 start to move to respective return locations. The return locations of the traveling units 200 are addresses or the like that are registered in advance by the users owning the traveling units 200.

The traveling-unit information DB 14 is a database holding information about the traveling unit 200 that are registered in the traveling-unit summoning system 100. For example, the traveling-unit information DB 14 is created in a storage area of the external storage device 103 of the center server 1. Details of the information stored in the traveling-unit information DB 14 will be given later.

Next, as functional structural elements, the user terminal 4 includes a control unit 41 and a server communication unit 42. For example, these functional structural elements are implemented by the CPU 401 of the user terminal 4 executing programs stored in the external storage device 403.

The server communication unit 42 is an interface to the center server 1. The server communication unit 42 outputs data received from the center server 1 to the control unit 41, through the wireless communication unit 404. The server communication unit 42 transmits data input from the control unit 41 to the center server 1, through the wireless communication unit 404. Data pieces that are received from the center server 1 include the use permission request for the traveling unit 200. Data pieces that are input from the control unit 41 and transmitted to the center server 1 include a response to the use permission request for the traveling unit 200. A response for the use permission request for the traveling unit 200 may be an acceptance response or a rejection response. In the case where authentication or the like is needed to receive a command for the traveling unit 200, authentication information such as a password may be transmitted to the center server 1, together with the acceptance response, for example.

For example, in the case where the use permission request for the traveling unit 200 is input from the center server 1, the control unit 41 causes a confirmation screen to be displayed on the touch panel display 405, the confirmation screen being used to check with the user regarding use permission. For example, the confirmation screen includes the scheduled use period for the traveling unit 200, the assembly location, the transport destination of the main body unit 300, and the like. Furthermore, the confirmation screen includes a button used for selecting acceptance or rejection regarding the use permission request, for example. The control unit 41 outputs an acceptance response or a rejection response to the server communication unit 42 in accordance with input of a user operation on the confirmation screen, and transmits the response to the center server 1.

Additionally, the functional structural elements of the center server 1 and the user terminal 4 may each be implemented by a plurality of different devices, for example. Furthermore, the functional structural elements of the center server 1 and the user terminal 4 may each be implemented by processing by hardware such as an FPGA.

FIG. 8 is an example of a traveling-unit information table that is stored in the traveling-unit information DB 14 of the center server 1. The traveling-unit information table holds information about the traveling unit 200 that is registered in the traveling-unit summoning system 100. The traveling-unit information table illustrated in FIG. 8 includes fields of "traveling unit ID", "owner user ID", "loadable weight", "schedule ID", "position information", and "state".

Identification information of the traveling unit 200 is stored in the field of "traveling unit ID". Identification information of the owner user of the traveling unit 200 is stored in the field of "owner user ID". A maximum payload of the traveling unit 200 is stored in the field of "loadable weight". For example, the maximum payload of the traveling unit 200 may be determined from the type of the traveling unit 200, or may be input by the owner user at the time of registration of the traveling unit 200.

Identification information of a transport schedule for the main body unit 300 that is set in the traveling unit 200 is stored in the field of "schedule ID". In the case where the transport schedule for the main body unit 300 is not set in the traveling unit 200, the field of "schedule ID" is empty. When the transport schedule for the main body unit 300 is set, the identification information of the schedule is stored in the field of "schedule ID" by the control unit 11.

Position information of the traveling unit 200 is stored in the field of "position information". For example, when registered in the traveling-unit summoning system 100, the traveling unit 200 starts to transmit the position information to the center server 1 every predetermined period. For example, the position information transmitted from the traveling unit 200 is input to the control unit 11 through the terminal communication unit 13, and is stored in the field of "position information" in the traveling-unit information table by the control unit 11.

A state of the traveling unit 200 is stored in the field of "state". For example, the state of the traveling unit 200 may be "idle", "in use", "providing transport" or the like. "In use" indicates a state of being used by the owner user. "Providing transport" indicates a state of being provided for transport of the main body unit 300 of the traveling-unit summoning system 100. A code or a flag indicating one of the states may be stored in the field of "state". For example, in the case where the owner user uses the traveling unit 200, a notification of start of use of the traveling unit 200 is transmitted from the user terminal 4 to the center server 1, and the field of "state" is updated from "idle" to "in use" when the notification is received by the control unit 11. For example, in the case where the traveling unit 200 is determined to be used for transport of the main body unit 300, the field of "state" is updated by the control unit 11 to "providing transport".

Additionally, the information pieces illustrated in FIG. 8 that are stored in the traveling-unit information table are merely examples, and are not restrictive. For example, in addition to the loadable weight, fields for storing information pieces about a loadable size, a type, a battery capacity, a remaining capacity of battery, a distance-to-empty and the like may be provided to be used to determine whether a plurality of traveling units 200 may carry the main body unit 300 or not. For example, a field for storing information indicating whether the traveling unit 200 may be physically coupled to another traveling unit 200 or not may also be provided.

<Flow of Processes>

Figure 9B:
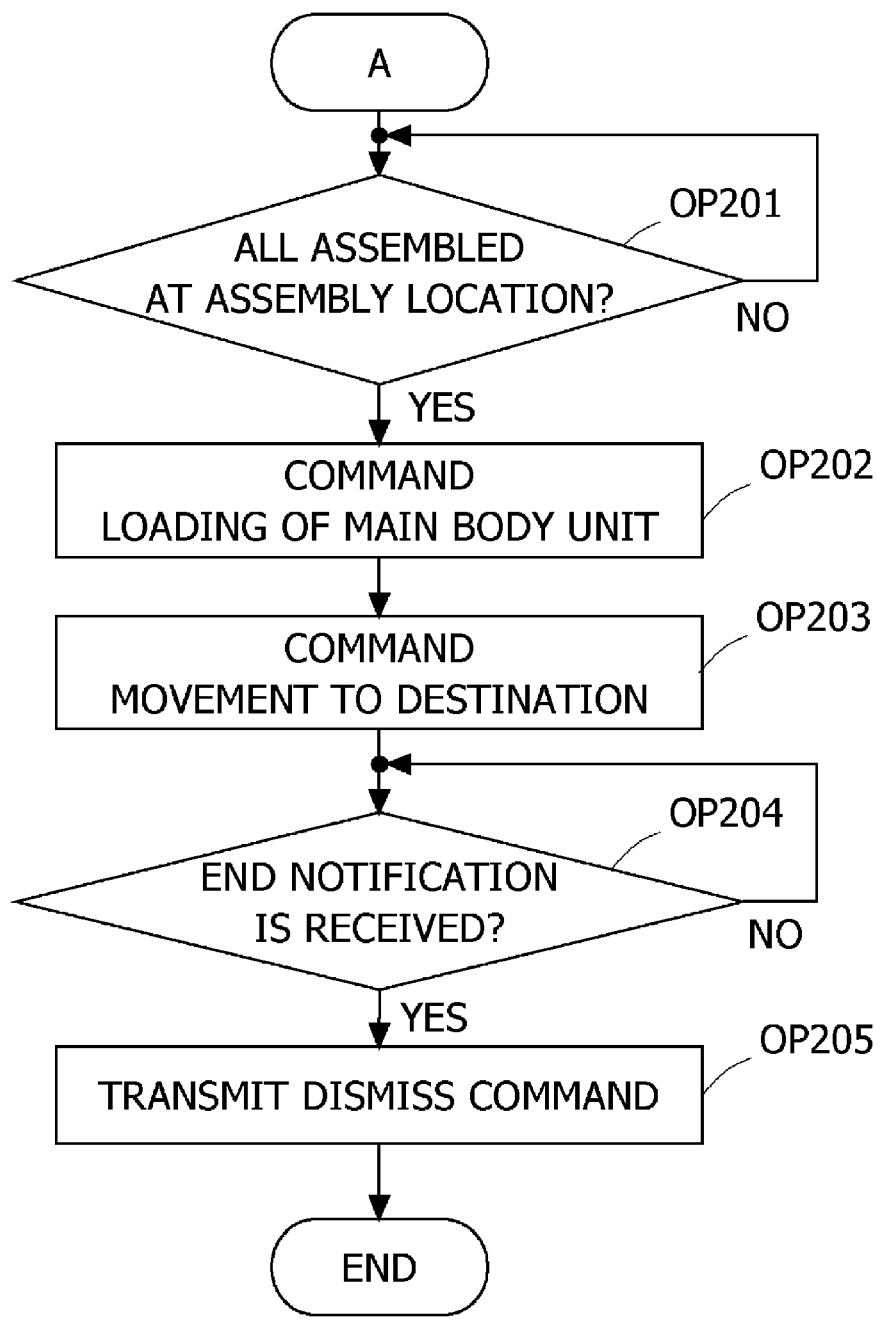
FIG. 9B is an example of flowcharts of a summoning process for the traveling unit performed by the center server.

FIGS. 9A and 9B are examples of flowcharts of a summoning process for the traveling unit 200 performed by the center server 1. The processes illustrated in FIGS. 9A and 9B are repeatedly performed during operation of the center server 1, for example. Additionally, a performer of the processes illustrated in FIGS. 9A and 9B is the CPU 101, but a description will be given taking a functional structural element as the performer for the sake of convenience.

In OP101, the control unit 11 determines whether a provision request for a traveling unit 200 is input or not. In the case where a provision request for a traveling unit 200 is input (OP101: YES), the process proceeds to OP102. In the case where a provision request for a traveling unit 200 is not input (OP101: NO), the process illustrated in FIG. 9A is ended.

In OP102, the control unit 11 acquires the number of traveling units 200 needed to transport the main body unit 300, from information about the main body unit 300 that is input together with the provision request for a traveling unit 200, for example. Furthermore, the control unit 11 acquires conditions demanded of each traveling unit 200 for transporting the main body unit 300. The conditions demanded of each traveling unit 200 for transporting the main body unit 300 include the loadable weight or the like, for example.

In OP103, the control unit 11 refers to the traveling-unit information DB 14, and extracts traveling units 200 that are capable of carrying the main body unit 300 that is the transport target. In OP104, the control unit 11 refers to the traveling-unit information DB 14, and extracts traveling units 200 existing within a predetermined range of the existing location of the main body unit 300 that is the transport target, from the traveling units 200 extracted in OP103. In OP105, traveling units 200 in the idle state are extracted from the traveling units 200 extracted in OP104.

In OP106, the control unit 11 selects traveling units 200 in a descending order of priority from the traveling units 200 extracted in OP105, for example, and transmits use permission requests for the selected traveling units 200 to the user terminals of the owner users. The type of the main body unit 300 that is the transport target, the assembly location, information about the transport destination, the scheduled use period for the traveling units 200, and the like are also transmitted together with the use permission requests for the traveling units 200. The assembly location may be the existing location of the main body unit 300 that is the transport target, or may be a location determined from the position information of the traveling units 200 that are transmission targets of the use permission requests, for example. The assembly location may be a middle position of existing locations of the traveling units 200 that are the transmission targets of the use permission requests, for example.

In OP107, the control unit 11 determines whether responses are received or not from the user terminals 4 for the use permission requests for the traveling units 200 transmitted in OP106. In the case where responses are received from the user terminals 4 (OP107: YES), the process proceeds to OP108. In the case where responses are not received from the user terminals 4 (OP107: NO), the process in OP107 is repeated.

In OP108, the control unit 11 determines whether or not the number of acceptance responses received from the user terminals 4 reached a predetermined number, or in other words, the number needed to transport the main body unit 300 that is the transport target. In the case where the number of acceptance responses received from the user terminals 4 reached the number needed to transport the main body unit 300 that is the transport target (OP108: YES), the process proceeds to OP109. In the case where the number of acceptance responses received from the user terminals 4 does not reach the number needed to transport the main body unit 300 that is the transport target (OP108: NO), the process proceeds to OP106, and the number of traveling units 200 corresponding to the number of shortages are selected in the descending order of priority, and the processes are performed again from OP106. The processes from OP106 to OP108 may be performed for one traveling unit 200 at a time, or may be performed collectively for a predetermined number of traveling units 200.

In OP109, the control unit 11 transmits a summon command to the traveling units 200 in relation to which acceptance responses are received from the user terminals 4 of the owner users. Information about the main body unit 300 that is the transport target, the assembly location, information about an assembly time, and the like are also transmitted together with the summon command. In the following, the plurality of traveling units 200 that are the transmission targets of the summon command will be simply referred to as the target traveling unit(s) 200.

Next, in OP201 in FIG. 9B, the control unit 11 determines whether all the target traveling units 200 are assembled at the assembly location or not. For example, the control unit 11 may determine whether all the target traveling units 200 are assembled at the assembly or not, on the basis of the position information of each target traveling unit 200. In the case where it is detected by the control unit 11 that all the target traveling units 200 are assembled at the assembly location (OP201: YES), the process proceeds to OP202. In the case where the traveling units 200 that are the transmission targets of the summon command are not assembled at the assembly location (OP201: NO), the process in OP201 is repeated.

In OP202, the control unit 11 transmits a load command for the main body unit 300 to the target traveling units 200. At this time, if the assembly location is not the existing location of the main body unit 300, a move command instructing movement to the existing location of the main body unit 300 may also be transmitted. When the load command for the main body unit 300 is received, the target traveling units 200 start moving to be coupled together or to perform convoy-traveling, and the main body unit 300 is loaded by a predetermined method.

In OP203, the control unit 11 transmits a move command instructing movement to the destination of transport, to the target traveling units 200 carrying the main body unit 300. When the move command instructing movement to the destination is received, the target traveling units 200 start moving to the destination. In the case where the traveling units 200 are to travel in a convoy, and the center server 1 is to control the convoy-traveling, the control unit 11 starts a process of controlling the convoy-traveling, for example. In the case where the traveling units 200 are to travel in a convoy, and the center server 1 is to select a leader of the convoy-traveling, the control unit 11 selects the leader of the convoy-traveling from the target traveling units 200.

In OP204, the control unit 11 determines whether an end notification is received or not. For example, when arriving at the destination of transport, the target traveling units 200 carrying the main body unit 300 may have the main body unit 300 unloaded and may return to the return locations, or may stay at the destination of transport with the main body unit 300 loaded thereon. The manner of use is freely determined by a user who is the source of the provision request for the traveling units 200. Accordingly, the end notification is input from a user on site via the user terminal of the source of the provision request for the traveling units 200 or through an input device of the main body unit 300 or the traveling unit 200, for example.

In the case where the end notification is received (OP204: YES), the process proceeds to OP205. In the case where the end notification is not received (OP204: NO), the process in OP204 is repeated.

In OP205, the control unit 11 transmits a dismiss command to the target traveling units 200. When the dismiss command is received, the target traveling units 200 start moving to the return locations. In the case where the target traveling units 200 are carrying the main body unit 300, the control unit 11 may transmit a move command instructing transport of the main body unit 300 to the original existing location, and may transmit the dismiss command when the main body unit 300 is detected to have been returned to the original existing location and unloaded from the traveling units 200. Additionally, the processes illustrated in FIGS. 9A and 9B are merely examples, and the processes by the center server 1 are not limited thereto. For example, an order of execution of the processes from OP103 to OP105 may be an arbitrary order.

FIG. 10 is an example of a flowchart of a process, by the user terminal 4, related to a use permission request for the traveling unit 200. The process illustrated in FIG. 10 is repeatedly performed during operation of the user terminal 4. A performer of the process illustrated in FIG. 10 is the CPU 401, but a description will be given taking a functional structural element as the performer for the sake of convenience.

In OP301, the control unit 41 determines whether a use permission request for the traveling unit 200 is received from the center server 1 or not. In the case where a use permission request for the traveling unit 200 is received from the center server 1 (OP301: YES), the process proceeds to OP302. In the case where a use permission request for the traveling unit 200 is not received from the center server 1 (OP301: NO), the process illustrated in FIG. 10 is ended.

In OP302, the control unit 41 causes the touch panel display 405 to display a confirmation screen related to use permission for the traveling unit 200, for example. In OP303, the control unit 41 determines whether or not an acceptance response is input by the user of the user terminal 4 in relation to the use permission request for the traveling unit 200. In the case where an acceptance response is input (OP303: YES), the process proceeds to OP304. In OP304, the control unit 11 transmits the acceptance response to the center server 1. Then, the process illustrated in FIG. 10 is ended.

In the case where the acceptance response is not input, or in other words, in the case where a rejection response is input (OP303: NO), the process proceeds to OP305. In OP305, the control unit 41 transmits the rejection response to the center server 1. The process illustrated in FIG. 10 is then ended.

<Advantageous and Effects of First Embodiment>

In the first embodiment, a traveling unit 200 that is a private-use vehicle that is registered is summoned according to a request, and a main body unit 300 that is not transportable by one traveling unit 200 that is a private-use vehicle is transported by a plurality of traveling units 200. Accordingly, a main body unit 300 that is not transportable by one traveling unit 200 can be transported by a plurality of traveling units 200, and a shortage of traveling units capable of transporting the main body unit 300 may be covered by the traveling units 200 that are private-use vehicles.

Furthermore, in the first embodiment, traveling units 200 that exist within a predetermined range of the existing location of the main body unit 300 that is the transport target are made the targets of summoning. The traveling units 200 may thus be swiftly summoned to the main body unit 300, and the main body unit 300 may be swiftly transported to the destination.

In the first embodiment, a plurality of traveling units 200 may transport the main body unit 300 by traveling in a convoy. This enables a traveling unit 200 not including a physical mechanism for coupling to transport the main body unit 300 in coordination with another traveling unit 200. Furthermore, each traveling unit 200 may be controlled by the center server 1 at the time of performing convoy-traveling. Accordingly, a traveling unit 200 not having performance high enough to perform control related to convoy-traveling may also transport the main body unit 300 by convoy-traveling.

Alternatively, convoy-traveling may be controlled by a plurality of traveling units 200 performing the convoy-traveling. For example, one traveling unit 200 is selected as the leader, and the traveling unit 200 that is the leader controls the convoy-traveling by issuing instructions to other traveling units 200. In this case, convoy-traveling may be performed even in a case where a traveling unit 200 including the function of vehicle-to-vehicle communication but not the function for performing communication with the center server 1 is included, for example. Furthermore, processing by the center server 1 is reduced, and the processing load on the center server 1 may be reduced.

The traveling unit 200 to be the leader of convoy-traveling may be selected by the center server 1 according to a predetermined criterion, or may be selected by the traveling units 200 performing convoy-traveling exchanging information with one another, for example. In the case where the traveling unit 200 to be the leader of convoy-traveling is selected by the center server 1, the leader of convoy-traveling may be swiftly selected because the center server 1 holds information about each traveling unit 200 in a centralized manner. In the case where the leader is to be selected by exchange of information among the traveling units 200 that are to perform convoy-traveling, the center server 1 is not used for selection, and the processing load on the center server 1 may be reduced.

Furthermore, in the first embodiment, the main body unit 300 is transported by the traveling units 200 for which use acceptance responses are obtained from the owner users. A traveling unit 200 is thus not used without permission from the owner user, and the owner user may be prevented from being interrupted from using the traveling unit 200.

Other Embodiments

The embodiment described above is an example, and the present disclosure may be changed and carried out as appropriate without departing from the gist of the present disclosure.

In the first embodiment, the main body unit 300 is assumed to be managed by the source of the provision request for the traveling unit 200. However, such a case is not restrictive, and the center server 1 may arrange for the main body unit 300 by receiving a provision request for the main body unit 300 together with the provision request for the traveling unit 200. In this case, the center server 1 holds information about the main body unit 300 that is provided to the traveling-unit summoning system 100, and when a provision request for the main body unit 300 is received, the center server 1 specifies the main body unit 300 that matches conditions of the provision request, for example. Then, as described in the first embodiment, the traveling units 200 for transporting the specified main body unit 300 are determined, and the summon command is transmitted. Accordingly, a shortage of the main body units 300 may also be covered, for example.

In the first embodiment, a description is given assuming that the traveling unit 200 includes a function of communicating with the center server 1, or in other words, a function of connecting to the network N1, but such a case is not restrictive. The traveling unit 200 does not have to include the function of communicating with the center server 1. However, in this case, the traveling unit 200 is to include another communication function for vehicle-to-vehicle communication, road-to-vehicle communication or the like. In the case where the traveling unit 200 does not include the function of connecting to the network N1, the center server 1 is unable to directly transmit a command to the traveling unit 200. Accordingly, the center server 1 may transmit a command to the traveling unit 200 through another traveling unit 200, a roadside unit or the like including both the function of connecting to the network N1 and the function for vehicle-to-vehicle communication, for example. This enables a wider range of traveling units 200 to be provided to the traveling-unit summoning system 100, and a greater number of traveling units 200 can be provided according to provision requests.

Furthermore, for example, in limited emergency circumstances of disasters and the like, a plurality of traveling units 200 may be caused to transport a main body unit 300 that exceeds a total of the maximum payloads of the plurality of traveling units 200. However, a weight of the main body unit 300 to be carried is not to exceed a predetermined allowable range from the total of the maximum payloads of the plurality of traveling units 200 used for transport. This enables the number of traveling units 200 for transporting one main body unit 300 to be reduced to a smaller number, and a greater number of main body units 300 may be transported by the traveling-unit summoning system 100.

Furthermore, in the first embodiment, the center server 1 manages the states of the traveling units 200, and transmits the use permission request and the summon command to a traveling unit 200 in the idle state, but such a case is not restrictive. For example, the center server 1 do not have to manage a current location and the state of the traveling unit 200. In this case, the center server 1 may manage a usual location of each traveling unit 200, and may transmit the use permission request to the user terminal 4 of the owner user of the traveling unit 200, the usual location of which is within a predetermined range of the existing location of the main body unit 300. Each of the owner users of the user terminals 4 receiving the use permission request may make his/her own judgement and transmit the use acceptance response to the center server 1. Alternatively, the center server 1 may transmit the summon command to the traveling unit 200, the usual location of which is within the predetermined range of the existing location of the main body unit 300. In this case, the traveling unit 200 receiving the summon command may determine whether its state is the idle state or not, and may respond to the summon command when in the idle state and move to the assembly location. The center server 1 may monitor the response from each traveling unit 200, cancel the summon command for responses after a predetermined number is reached, and adjust the number of traveling units 200 that move to the assembly location.

Furthermore, in the first embodiment, the center server 1 transmits the use permission request to the user terminal 4 of the owner user of a traveling unit 200, and summons the traveling unit 200 after a permission is obtained from the owner user. However, such a case is not restrictive, and transmission of the use permission request to the owner user of the traveling unit 200 may be omitted.

The processes and means described in the present disclosure may be freely combined to the extent that no technical conflict exists.

A process which is described to be performed by one device may be performed divided among a plurality of devices. Processes described to be performed by different devices may be performed by one device. Each function is to be implemented by which hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. An information processing apparatus comprising:
    a memory configured to store information about mobile bodies, each of which forms a vehicle by being coupled with a main body unit and is capable of autonomous driving; and
    a processor configured to:
        select, from a plurality of first mobile bodies existing within a predetermined range, a needed number of the first mobile bodies for transport of one first main body unit that is larger or heavier than a main body unit that can be carried by only one of the first mobile bodies;
        transmit, to user terminals of users who own the selected first mobile bodies, use permission requests for the selected first mobile bodies;
        determine whether or not a number of acceptance responses, which are from the user terminals and are for using the selected first mobile bodies, reaches the needed number;
        in a case where the number of acceptance responses does not reach the needed number, (i) select additionally, from the plurality of first mobile bodies existing within the predetermined range, a number of next first mobile bodies corresponding to a shortage of the first mobile bodies and (ii) transmit a use permission request to a user terminal of a user who owns one of the next first mobile bodies additionally selected;
        in a case where the number of acceptance responses reaches the needed number, transmit a summon command to the first mobile bodies for which the acceptance responses from the user terminals were transmitted, those first mobile bodies being summoned first mobile bodies, and the summon command summoning the summoned first mobile bodies to a predetermined assembly location;
        cause the summoned first mobile bodies assembled at the predetermined assembly location to carry the one first main body unit; and
        cause the summoned first mobile bodies to move to a predetermined destination, wherein
    each of the plurality of first mobile bodies is owned by a predetermined user as a private-use vehicle.

2. The information processing apparatus according to claim 1, wherein, when the summoned first mobile bodies carrying the one first main body unit are no longer being used, the processor transmits a dismiss command to the summoned first mobile bodies, the dismiss command instructing movement of the summoned first mobile bodies to respective return locations.

3. The information processing apparatus according to claim 1, wherein
    the information about the mobile bodies includes information indicating a state of at least one of the mobile bodies, and
    the first mobile bodies to which the processor transmits the summon command are each in an idle state.

4. The information processing apparatus according to claim 1, wherein the summoned first mobile bodies caused by the processor to assemble at the predetermined assembly location are each in an idle state at a time of reception of the summon command.

5. The information processing apparatus according to claim 1, wherein the processor causes the summoned first mobile bodies to move and carry the one first main body unit by convoy-traveling.

6. The information processing apparatus according to claim 5, wherein the processor controls each of the summoned first mobile bodies in relation to the convoy-traveling.

7. The information processing apparatus according to claim 5, wherein
    the processor is configured to select from the summoned first mobile bodies, according to a predetermined condition, a mobile body to be a leader of the convoy-traveling at a time of moving and carrying the one first main body unit, and
    the summoned first mobile bodies perform vehicle-to-vehicle communication with one another and perform the convoy-traveling according to an instruction from the mobile body selected as the leader.

8. The information processing apparatus according to claim 5, wherein the processor selects a first mobile body that is to be a leader from among the summoned first mobile bodies, and the processor causes the summoned first mobile bodies to perform the convoy-traveling.

9. The information processing apparatus according to claim 1, wherein the processor determines the needed number of the first mobile bodies based on the information about the mobile bodies.

10. An information processing method comprising:
    storing, in a memory, information about mobile bodies, each of which forms a vehicle by being coupled with a main body unit and is capable of autonomous driving;
    selecting, from a plurality of first mobile bodies existing within a predetermined range, a needed number of the first mobile bodies for transport of one first main body unit that is larger or heavier than a main body unit that can be carried by only one of the first mobile bodies;
    transmitting, to user terminals of users who own the selected first mobile bodies, use permission requests for the selected first mobile bodies;

determining whether or not a number of acceptance responses, which are from the user terminals and are for using the selected first mobile bodies, reaches the needed number;

in a case where the number of acceptance responses does not reach the needed number, (i) selecting additionally, from the plurality of first mobile bodies existing within the predetermined range, a number of next first mobile bodies corresponding to a shortage of the first mobile bodies and (ii) transmitting a use permission request to a user terminal of a user who owns one of the next first mobile bodies additionally selected;

in a case where the number of acceptance responses reaches the needed number, transmitting a summon command to the first mobile bodies for which the acceptance response from the user terminals were transmitted, those first mobile bodies being summoned first mobile bodies, and the summon command summoning the summoned first mobile bodies to a predetermined assembly location;

causing the summoned first mobile bodies assembled at the predetermined assembly location to carry the one first main body unit; and causing the summoned first mobile bodies to move to a predetermined destination, wherein each of the plurality of first mobile bodies is owned by a predetermined user as a private-use vehicle.

11. The information processing method according to claim 10, comprising transmitting, when the summoned first mobile bodies carrying the one first main body unit are no longer being used, a dismiss command to the summoned first mobile bodies, the dismiss command instructing movement of the summoned first mobile bodies to respective return locations.

12. The information processing method according to claim 10, wherein the information about the mobile bodies includes information indicating a state of the at least one of the mobile bodies, and the first mobile bodies to which the summon command is transmitted are each in an idle state.

13. The information processing method according to claim 10, wherein the summoned first mobile bodies move and carry the one first main body unit by convoy-traveling.

14. The information processing method according to claim 13, wherein each of the summoned first mobile bodies is controlled in relation to the convoy-traveling.

15. The information processing method according to claim 13, wherein
a mobile body, which is to be a leader of the convoy-traveling at a time of moving and carrying the one first main body unit, is selected from the summoned first mobile bodies according to a predetermined condition, and
the summoned first mobile bodies perform vehicle-to-vehicle communication with one another and perform the convoy-traveling according to an instruction from the mobile body selected as the leader.

16. The information processing method according to claim 13, wherein the summoned first mobile bodies perform vehicle-to-vehicle communication with one another, select from the summoned first mobile bodies a first mobile body that is to be a leader, and perform the convoy-traveling.

17. The information processing method according to claim 10, wherein the needed number of the first mobile bodies is determined based on the information about the mobile bodies.

18. A non-transitory computer-readable medium storing an information processing program for causing a user terminal to:
receive a use permission request for a mobile body that is owned by an owner of the user terminal as a private-use vehicle, the mobile body forming a vehicle by being coupled with a main body unit and being capable of autonomous driving;
transmit a response to the use permission request; and
receive a summon command summoning the mobile body to a predetermined assembly location in a predetermined case, wherein
the use permission request requests permission to use the mobile body as a first mobile body, in a case where one first main body unit that is larger or heavier than a main body unit that can be carried by only one first mobile body is to be carried and moved by a needed number of first mobile bodies existing within a predetermined range, and
the predetermined case is
a case where the response is an acceptance response for using the mobile body as the first mobile body, and
a case where a number of acceptance responses are determined to reach the needed number for transport of the one first main body unit.

* * * * *